June 13, 1950 S. M. UDALE 2,511,385
TWO-STAGE GAS TURBINE
Filed March 14, 1945
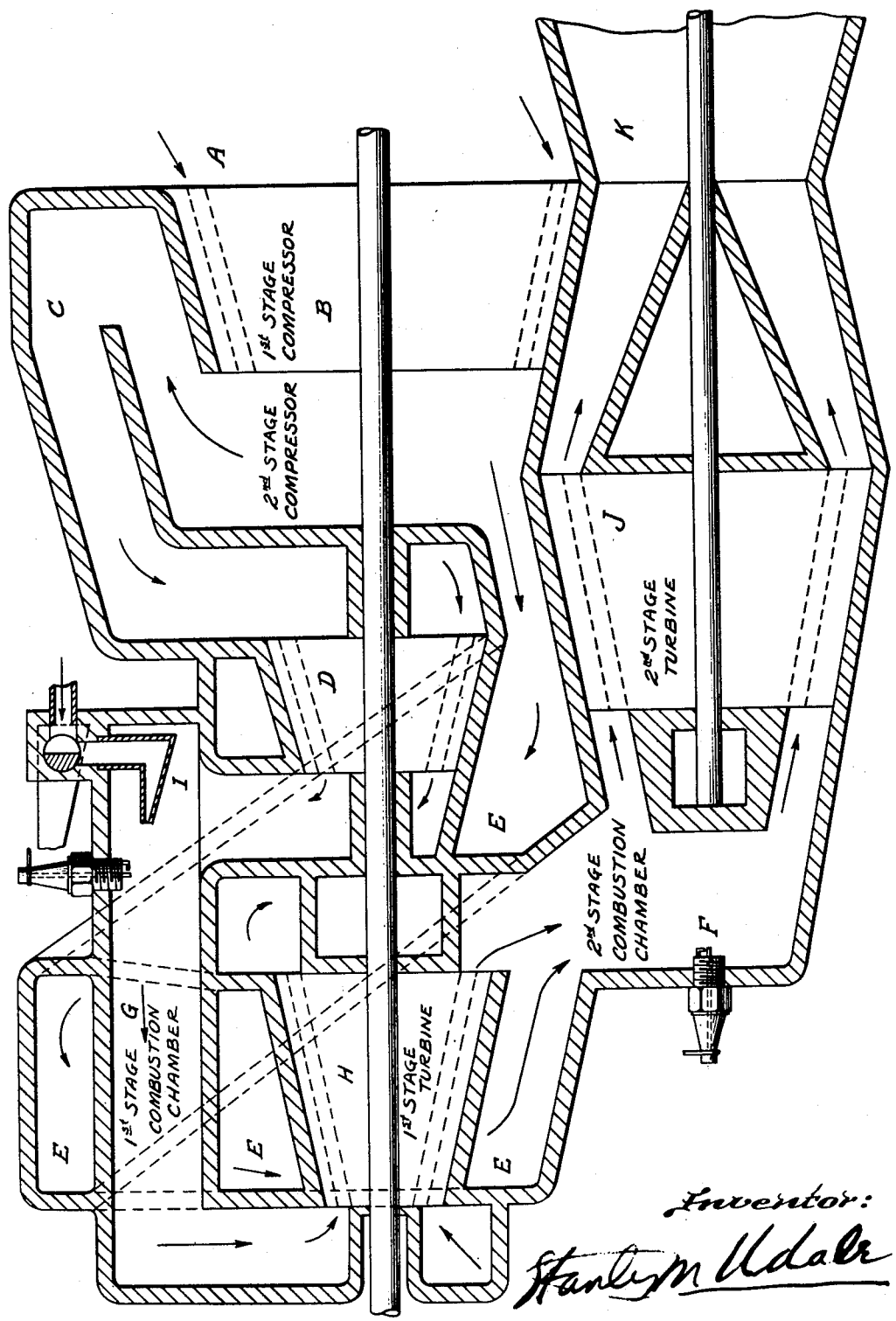
Inventor:
Stanley M Udale Patented June 13, 1950

2,511,385

UNITED STATES PATENT OFFICE 2,511,385

TWO-STAGE GAS TURBINE

Stanley M. Udale, Detroit, Mich., assignor to George M. Holley and Earl Holley

Application March 14, 1945, Serial No. 582,649

3 Claims. (Cl. 60—41)

The object of this invention is to get from a gas turbine the greatest efficiency without overheating the turbine. This result I obtain by burning the fuel in two stages, that is, I first burn the fuel to make CO and then add extra air to make the combustion complete so as to turn the CO into $CO_2$. The air for complete combustion is used to cool the first-stage combustion chamber.

The figure shows diagrammatically the elements of my invention.

A is the air entrance, B is a first-stage supercharger, C is an intercooler, D is a second-stage supercharger which supercharges one-half the air, E is a bypass leading from the outlet of supercharger B and discharges one-half of the air to the second-stage combustion chamber F, G is the first-stage combustion chamber into which excess of fuel is discharged through nozzle I so that incomplete combustion takes place in this first-stage combustion chamber G. Carbon monoxide is formed together with some water vapor in the form of super-heated steam. The first-stage turbine H is operated with these products of incomplete combustion from the first-stage combustion chamber G and drives the two superchargers B and D. The second-stage turbine J is operated by the products of complete combustion $CO_2$ provided by the addition of air, which is heated in the bypass E, which flows into the second-stage combustion chamber F, after passing around the first-stage combustion chamber G and the first-stage gas turbine H. The gases issuing at K may be utilized for jet propulsion and the shaft of the second-stage gas turbine J may be used to drive a propeller.

What I claim is:

1. The method of operating a compound two-stage gas turbine power plant of the continuous combustion type having two expansion stages by combustion type having two expansion stages by by the aid of first stage and second stage fluid fuel gas generators which includes the steps of compressing all the air required for both stages to a relatively low pressure in a first stage air compressor and a portion only of the air to a relatively higher pressure in a second stage air compressor, supplying this small quantity of highly compressed air together with fluid fuel to the first stage gas generator so as to produce therein incompletely burnt, highly compressed, motive fluid, expanding this motive fluid in the first stage gas turbine to the lower pressure of the first stage air compressor, reheating this expanded motive fluid in the second stage gas generator by supplying to it compressed air bypassed from the first stage air compressor so as to complete the combustion of said expanded motive fluid and expanding this low pressure reheated motive fluid thus produced in said second stage gas generator in the second stage gas turbine.

2. The method set forth in claim 1 in which the incompletely burnt high pressure motive fluid is cooled by the compressed air bypassed from the first stage compressor before this latter reaches the second stage gas generator.

3. The method of operating a compound two-stage gas turbine power plant including two stage compressors, two stage turbines and two stage combustion chambers, the said first stage combustion chamber having a fuel nozzle, an air passage from the second stage compressor, an air passage from the first stage combustion chamber, an air passage forming a bypass from the first stage compressor to the second stage combustion chamber which method comprises forming a highly compressed motive fluid with air from the second stage air compressor by supplying to said air an excess of fuel relative to the air for incomplete combustion in the first stage combustion chamber driving the first stage turbine with the said highly compressed motive fluid, supplying air from the first stage compressor direct to the second stage combustion chamber and admitting thereto the exhaust from said first stage turbine, and finally driving the second stage turbine with the motive fluid thus produced in the second stage combustion chamber.

STANLEY M. UDALE.

REFERENCES CITED

The following references are of record in the file of this patent:

UNITED STATES PATENTS

| Number | Name | Date |
| --- | --- | --- |
| 2,257,982 | Seippel | Oct. 7, 1941 |
| 2,303,381 | New | Dec. 1, 1942 |
| 2,312,995 | Anxionnaz | Mar. 2, 1943 |
| 2,354,213 | Jendrassik | July 25, 1944 |
| 2,379,455 | Prince | July 3, 1945 |